United States Patent
Oyama

(10) Patent No.: US 11,332,057 B2
(45) Date of Patent: May 17, 2022

(54) VEHICLE SEAT

(71) Applicant: HONDA MOTOR CO., LTD., Tokyo (JP)

(72) Inventor: Rikiya Oyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/391,044

(22) Filed: Aug. 2, 2021

(65) Prior Publication Data

US 2022/0063462 A1   Mar. 3, 2022

(30) Foreign Application Priority Data

Aug. 26, 2020   (JP) .............................. JP2020-142835

(51) Int. Cl.
*B60N 2/75* (2018.01)

(52) U.S. Cl.
CPC ...................................... *B60N 2/76* (2018.02)

(58) Field of Classification Search
CPC ........... A47C 7/543; B60N 2/753; B60N 2/76
See application file for complete search history.

(56) References Cited

U.S. PATENT DOCUMENTS

| | | | | |
|---|---|---|---|---|
| 3,191,995 | A * | 6/1965 | Shelton | B60N 2/76 297/411.33 |
| 3,322,463 | A * | 5/1967 | Neale | B60N 2/01 297/411.3 |
| 5,845,968 | A * | 12/1998 | Lovie | B60N 2/286 297/256.1 |
| 5,911,470 | A * | 6/1999 | Aumond | B60N 3/107 297/115 |

FOREIGN PATENT DOCUMENTS

| | | | | |
|---|---|---|---|---|
| DE | 10161422 | A1 * | 6/2003 | ............ B60N 2/76 |
| DE | 102005037785 | A1 * | 2/2007 | ............ B60N 2/753 |
| DE | 102005056570 | A1 * | 5/2007 | ............ B60N 2/76 |
| EP | 2311685 | A2 * | 4/2011 | ............ A45C 5/03 |
| GB | 2412849 | A * | 10/2005 | ............ B60N 2/76 |
| JP | 2012188014 | A | 10/2012 | |

* cited by examiner

*Primary Examiner* — Milton Nelson, Jr.
(74) *Attorney, Agent, or Firm* — CKC & Partners Co., LLC

(57) ABSTRACT

A vehicle seat includes a seat part, a back part, and an armrest pivotally supported by the seat part. The armrest includes an armrest body and a position adjustment mechanism that is capable of adjusting the armrest body between at least two positions including a deployment position in which the armrest body is deployed above the seat part and a retraction position in which the armrest body is retracted to be positioned adjacent to the seat part. An upper surface of the armrest body in the retraction position is coplanar with an upper surface of the seat part.

4 Claims, 10 Drawing Sheets

VEHICLE SEAT

This application is based on and claims the benefit of priority from Japanese Patent Application 2020-142835, filed on 26 Aug. 2020, the content of which is incorporated herein by reference.

BACKGROUND OF THE INVENTION

Field of the Invention

The present disclosure relates to a vehicle seat.

Related Art

A vehicle seat which is provided with an armrest has been known (see, for example, Patent Document 1). The armrest of this known vehicle seat includes a stay pivotally supported on a side portion of a back of the vehicle seat and extending upward, and an armrest body mounted to an end of the stay and projecting rearward. The entire armrest has an L-shape. When the armrest is not used, a seated person can retract the armrest by turning it forward around a pivot part of the stay.

The retracted armrest is in a position in which the armrest does not support an arm of the seated person.

Patent Document 1: Japanese Unexamined Patent Application, Publication No. 2012-188014

SUMMARY OF THE INVENTION

The vehicle seat disclosed in Patent Document 1 is configured such that when not being used, the armrest is retracted by being turned forward. However, when the armrest is retracted, the armrest body stands upright in front of a seat part of the vehicle seat. Accordingly, the armrest body is in the way of a driver or a passenger who is getting in or out of the vehicle, and hinders the movement of getting in or out of the vehicle.

The present disclosure is intended to provide a vehicle seat including an armrest which does not hinder a movement for getting in or out of a vehicle and facilitates the movement for getting in or out of the vehicle when the armrest is retracted.

A first aspect of the present disclosure is directed to a vehicle seat (e.g., a vehicle seat 1 to be described later) including a seat part (e.g., a seat part 2 to be described later); a back part (e.g., a back part 3 to be described later); and an armrest (e.g., an armrest 4 to be described later) pivotally supported by the seat part. The armrest includes an armrest body (e.g., an armrest body 41 to be described later) and a position adjustment mechanism (e.g., a position adjustment mechanism 42 to be described later) that is capable of adjusting the armrest body between at least two positions including a deployment position in which the armrest body is deployed above the seat part and a retraction position in which the armrest body is retracted to be positioned adjacent to the seat part. An upper surface of the armrest body in the retraction position is coplanar with an upper surface (e.g., an upper surface 21a to be described later) of the seat part.

A second aspect of the present disclosure is an embodiment of the vehicle seat according to the first aspect. In the second aspect, the position adjustment mechanism may enable multi-stage angle adjustment of the armrest body in the deployment position.

A third aspect of the present disclosure is an embodiment of the vehicle seat according to the first or second aspect. In the third aspect, the armrest may include a pair of armrests respectively arranged on right and left sides of the seat part.

A fourth aspect of the present disclosure is an embodiment of the vehicle seat according to any one of the first to third aspects. In the fourth aspect, the seat part includes a seat cushion (e.g., a seat cushion 21 to be described later) and a seat part body (e.g., a seat part body 22 to be described later) sized to have protruding portions (e.g., protruding portions 221) that respectively protrude laterally outward relative to right and left sides of the seat cushion, the seat part body being harder than the seat cushion. The armrest body in the retraction position is arranged on an upper surface (e.g., an upper surface 221a) of the protruding portion of the seat part body that protrudes relative to the seat cushion.

A fifth aspect of the present disclosure is an embodiment of the vehicle seat according to the fourth aspect. In the fifth aspect, the protruding portion has a rib (e.g., a rib 222 to be described later) or a recess formed on the upper surface thereof. The armrest body has a recess (e.g., a recess 415 to be described later) or a rib formed on a lower surface (e.g., a lower surface 414a to be described later) thereof, the recess or the rib of the armrest body being engageable with the rib or the recess of the protruding portion when the armrest body is in the retraction position.

According to the first aspect, the upper surface of the armrest body in the retraction position is coplanar with the upper surface of the seat part. Thus, when restricted, the armrest does not hinder a movement for getting in or out of a vehicle and facilitates the movement for getting in or out of the vehicle. When the armrest is retracted, an occupant can easily move in the front-rear direction in the vehicle (walk through) without being hindered by the armrest.

According to the second aspect, the position adjustment mechanism enables multi-stage angle adjustment of the armrest body in the deployment position. This feature allows a seated person to deploy and optimally position the armrest according to his/her physique and liking.

According to the third aspect, since the armrests are arranged on the right and left sides of the seat part, both arms of the seated person can be supported when the armrest are deployed.

According to the fourth aspect, the armrest body in the retraction position is arranged on the upper surface of the protruding portion of the seat part body that is harder than the seat cushion. This feature contributes to an increase in a load-carrying capacity of the armrest body in the retraction position.

According to the fifth aspect, the recess or the rib of the armrest body in the retraction position engages with the rib or recess of the protruding portion of the seat part body. This feature allows the armrest body in the retraction position to increase in load-carrying capacity in a lateral direction.

DETAILED DESCRIPTION OF THE INVENTION

Figure 1:
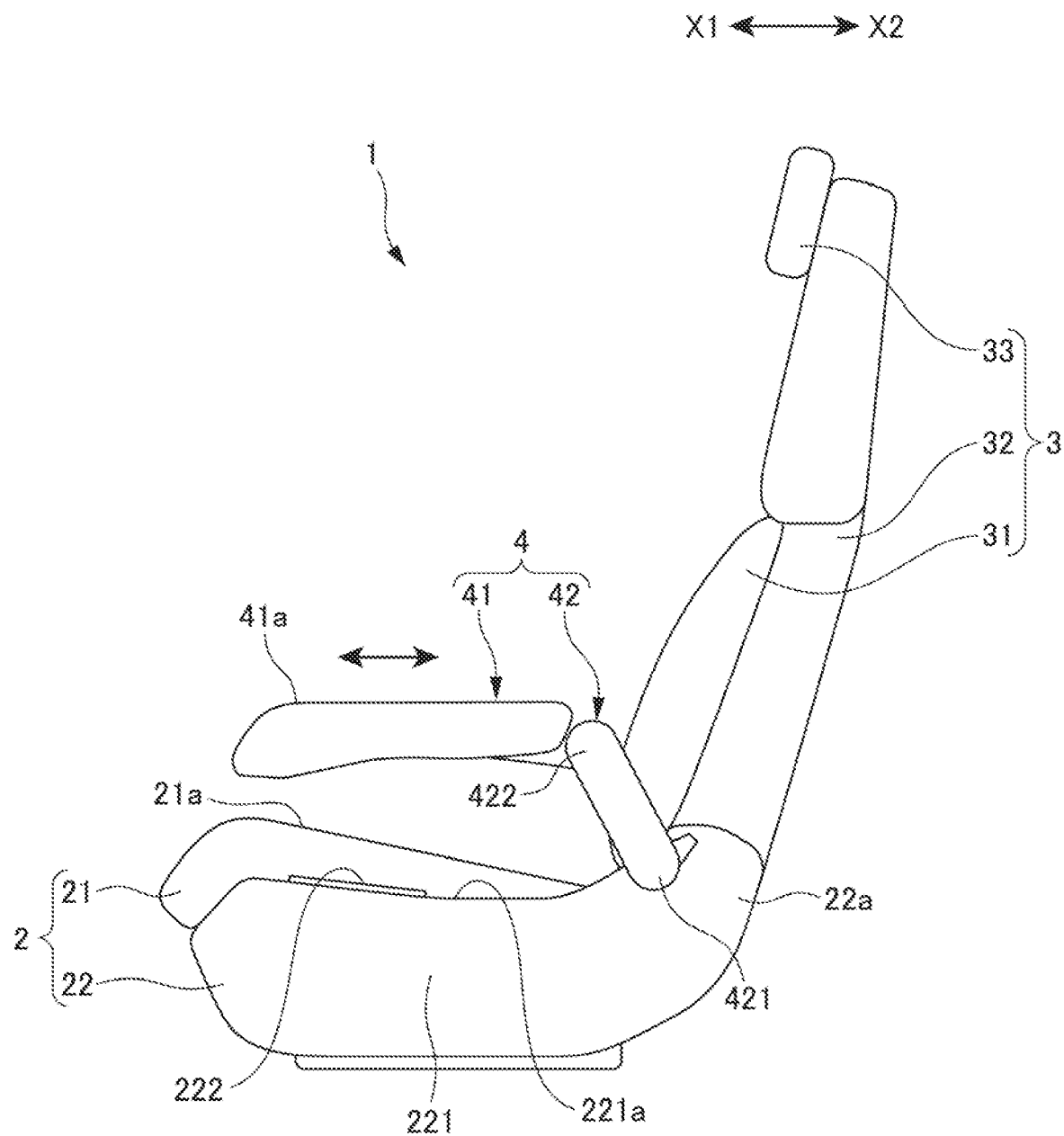
FIG. 1 is a side view of a vehicle seat having an armrest in a deployment position.

Embodiments of the present disclosure will be described in detail with reference to the drawings. As illustrated in FIGS. 1 to 4, a vehicle seat 1 according to the present embodiment is for one person, and includes a seat part 2 for supporting the buttocks of a seated person, a back part 3 for supporting the back of the seated person, and armrests 4 for supporting the arms of the seated person.

The seat part 2 includes a seat cushion 21 and a seat part body 22 that supports the seat cushion 21 from below. The seat cushion 21 has suitable cushioning that provides a comfortable ride for the seated person. On the other hand, the seat part body 22 is harder than the seat cushion 21 to stably support the seat cushion 21.

Figure 3:
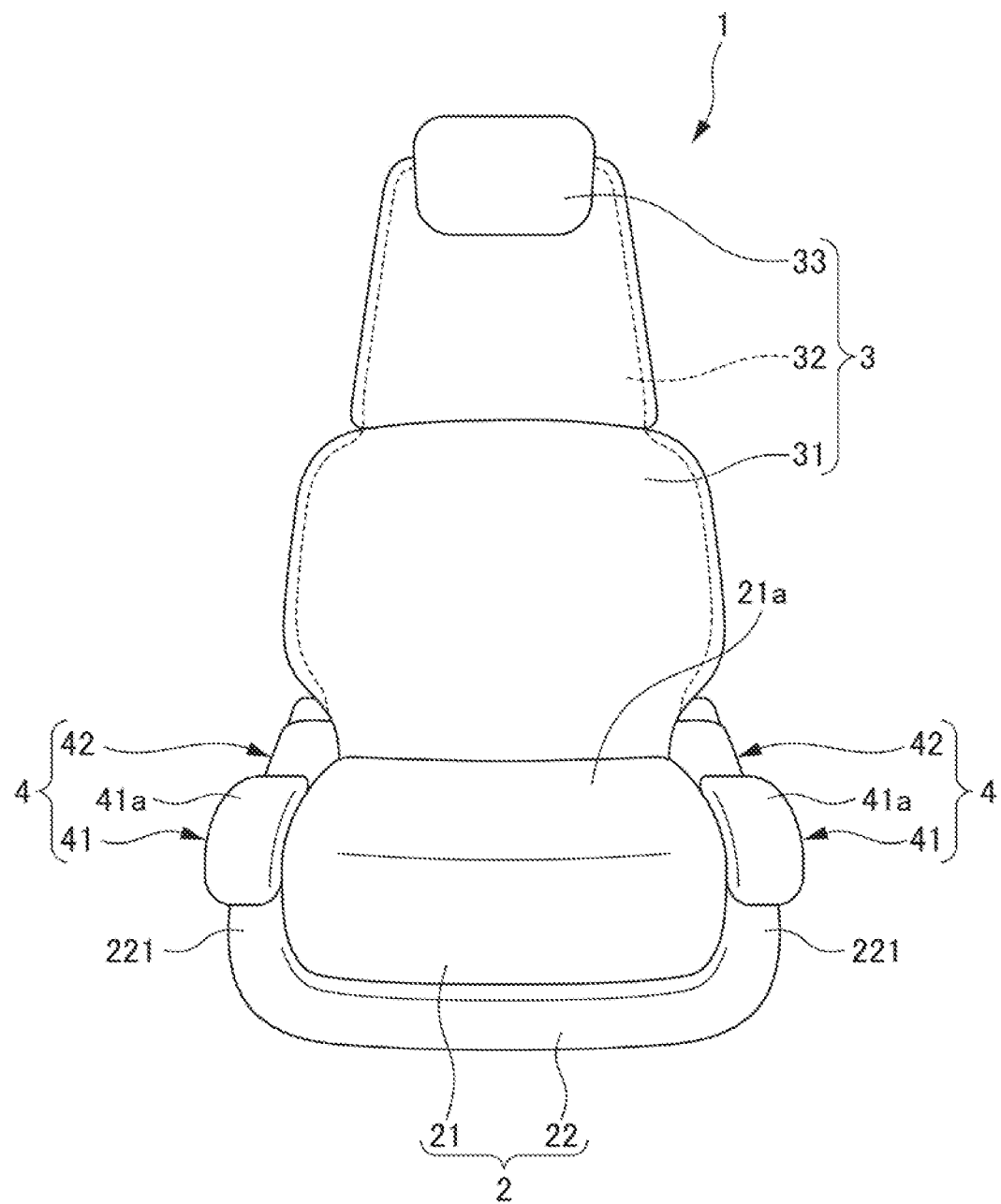
FIG. 3 is a front view of the vehicle seat having the armrests in the retraction position.
Figure 4:
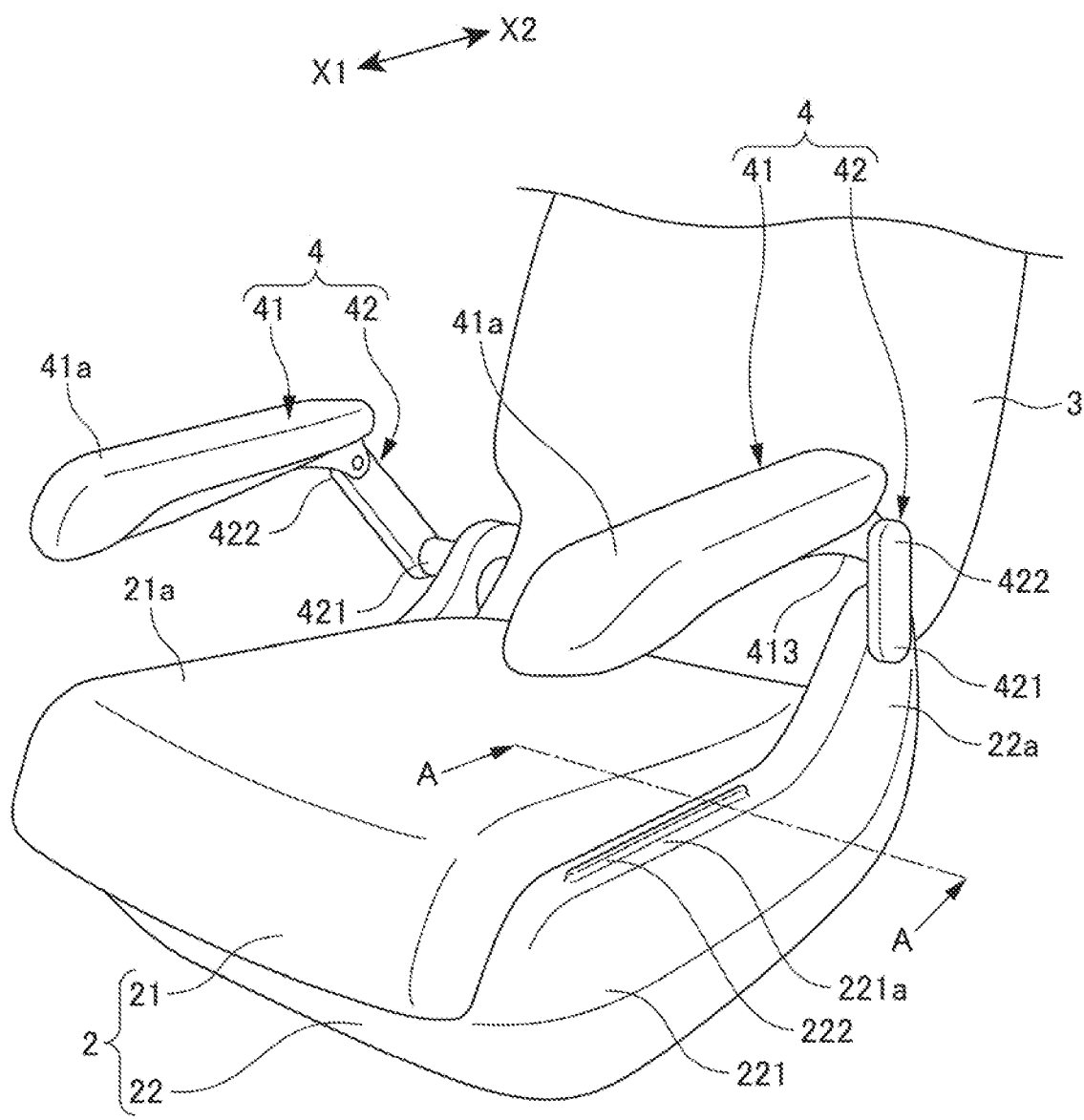
FIG. 4 is a perspective view illustrating a seat part of the vehicle seat having the armrests in the deployment position.

As illustrated in FIG. 3, the seat part body 22 has such a size that the seat part body 22 has portions laterally protruding relative to the seat cushion 21. Thus, the seat part body 22 has protruding portions 221, 221 that respectively constitute right and left side portions of the seat part body 22 and protrude laterally outward relative to the seat cushion 21. The protruding portion 221 has an upper surface 221a and the seat cushion 21 has an upper surface 21a, the upper surface 221a being located below the upper surface 21a. As illustrated in FIGS. 1 and 4, the upper surface 221a of the protruding portion 221 is provided with a rib 222 that extends linearly in a front-rear direction. Although not illustrated, the protruding portion 221 located on the left side of the seated person has the same structure and is provided with a rib on the upper surface.

The back part 3 includes a back cushion 31, a back part body 32 that supports the back cushion 31 from rear, and a headrest 33 that is attached to an upper portion of the back part body 32. The back cushion 31 and the headrest 33 have suitable cushioning that provides a comfortable ride for the seated person. On the other hand, the back part body 32 is harder than the back cushion 31 and the headrest 33 to stably support the back cushion 31 and the headrest 33.

The back part 3 is pivotally mounted to a rear end portion of the seat part 2 via a known angle adjustment mechanism such that the back part 3 is pivotable. Accordingly, the back part 3 can be adjusted in angle in multiple stages along an X1 direction and an X2 direction illustrated in FIG. 1. The X1 direction is a forward direction with respect to the vehicle seat 1. The X2 direction is a rearward direction with respect to the vehicle seat 1.

The armrest 4 includes an armrest body 41 that supports an arm of the seated person, and a position adjustment mechanism 42 via which the armrest body 41 is mounted to the seat part 2 and with which a position of the armrest body 41 is adjusted with respect to the seat part 2. The vehicle seat 1 of the present embodiment has a pair of armrests 4, 4 respectively arranged on the right and left sides of the seat part 2 such that both arms of the seated person can be supported.

Figure 5:
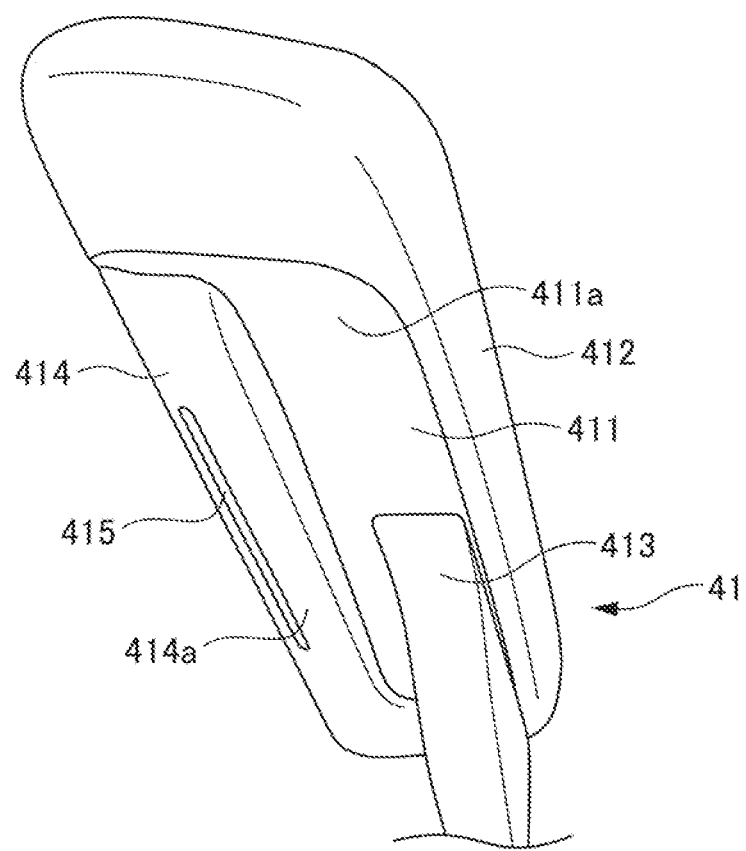
FIG. 5 is a perspective view illustrating an armrest body as viewed from below.

The armrest body 41 is a member that is long in the front-rear direction. As illustrated in FIG. 5, the armrest body 41 includes a core 411 that is coupled to the position adjustment mechanism 42, an exterior sheath 412 that covers a surface of the core 411 and imparts suitable cushioning to the armrest body 41, and a coupler 413 that couples the core 411 to the position adjustment mechanism 42 such that the core 411 is turnable with respect to the position adjustment mechanism 42. The exterior sheath 412 does not cover a lower surface 411a of the core 411. As indicated by the arrow in FIG. 1, the core 411 of the armrest body 41 is slidable in the front-rear direction with respect to the coupler 413. This configuration allows the seated person to adjust the position of the armrest body 41 in the front-rear direction as he/she desires.

FIG. 5 illustrates the armrest body 41 arranged on the left side of the seated person. The coupler 413 of the armrest body 41 is off-center with respect to the lower surface 411a of the core 411 and is close to a side of the core 411 located away from the seat part 2. The lower surface 411a of the core 411 is provided with a ridge 414 that protrudes downward and is integrated with the lower surface 411a. The ridge 414 is located closer than the coupler 413 to the seat part 2. The ridge 414 extends in the front-rear direction of the armrest body 41. The ridge 414 has a lower surface 414a on which a recess 415 linearly extending in the front-rear direction is formed. The recess 415 corresponds to the rib 222 provided on the upper surface 221a of the protruding portion 221 of the seat part body 22, and is sized to be engageable with the rib 222. Although not illustrated, the other armrest 4, which is arranged on the right side of the seated person, has the same but reversed structure, and form a symmetrical pair with the armrest illustrated in FIG. 5.

The position adjustment mechanism 42 includes a long member coupling the armrest body 41 to the seat part 2. The position adjustment mechanism 42 has a first pivot part 421 at one end thereof and a second pivot part 422 at the other end thereof. The position adjustment mechanism 42 is pivotally supported on each of right and left side surfaces of a rear end portion 22a of the seat part body 22 by means of the first pivot part 421 such that the position adjustment mechanism 42 is turnable. The position adjustment mechanism 42 pivotally supports the coupler 413 of the armrest body 41 by means of the second pivot part 422 such that the coupler 413 is turnable.

Figure 2:
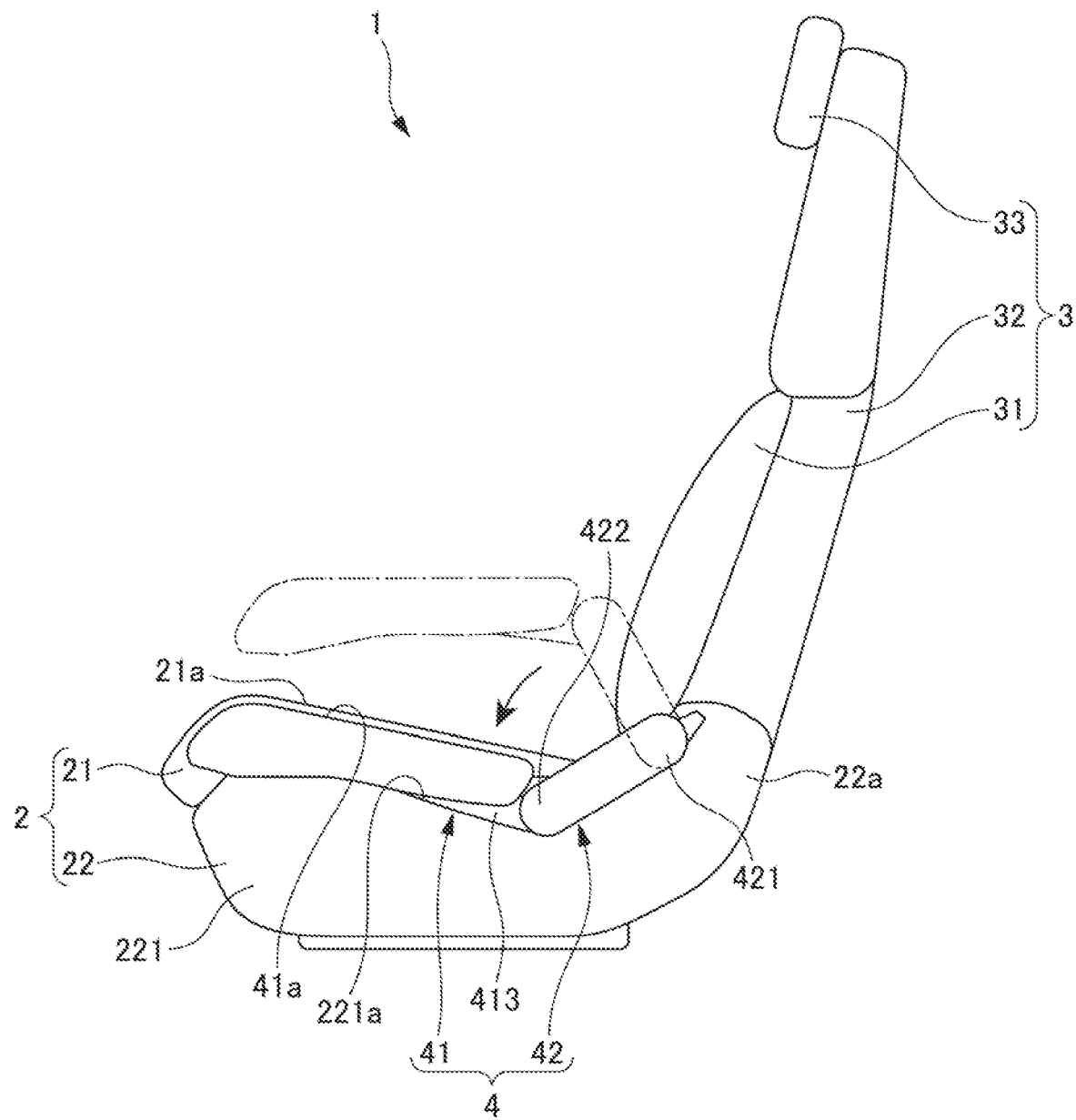
FIG. 2 is a side view of the vehicle seat having the armrest in a retraction position.

The position adjustment mechanism 42 is capable of adjusting the armrest body 41 between at least two positions: a deployment position in which the armrest body 41 is deployed above the seat part 2 (the position illustrated in FIGS. 1 and 4); and a retraction position in which the armrest body 41 is retracted to be positioned adjacent to the seat part 2 (the position illustrated in FIGS. 2 and 3).

Specifically, when the position adjustment mechanism 42 is turned rearward around the first pivot part 421, the armrest body 41 is moved to the deployment position above the upper surface 21a of the seat cushion 21, as illustrated in FIGS. 1 and 4. This movement of the armrest bodies 41 to the deployment position brings the armrests 4 into a deployment state in which the armrests 4 can support the arms of the seated person. When the position adjustment mechanism 42 is turned forward around the first pivot part 421, the armrest body 41 is moved to the retraction position to come to lie along the upper surface 221a of the protruding portion 221 of the seat part body 22, as illustrated in FIGS. 2 and 3. This movement of the armrest bodies 41 to the retraction position brings the armrests 4 into a retraction state. As illustrated in FIGS. 2 and 3, in the retraction position, the armrest bodies 41 do not protrude upward or forward relative to the seat part 2. The specifics of the structure of the position adjustment mechanism 42 will be described later.

Figure 6:
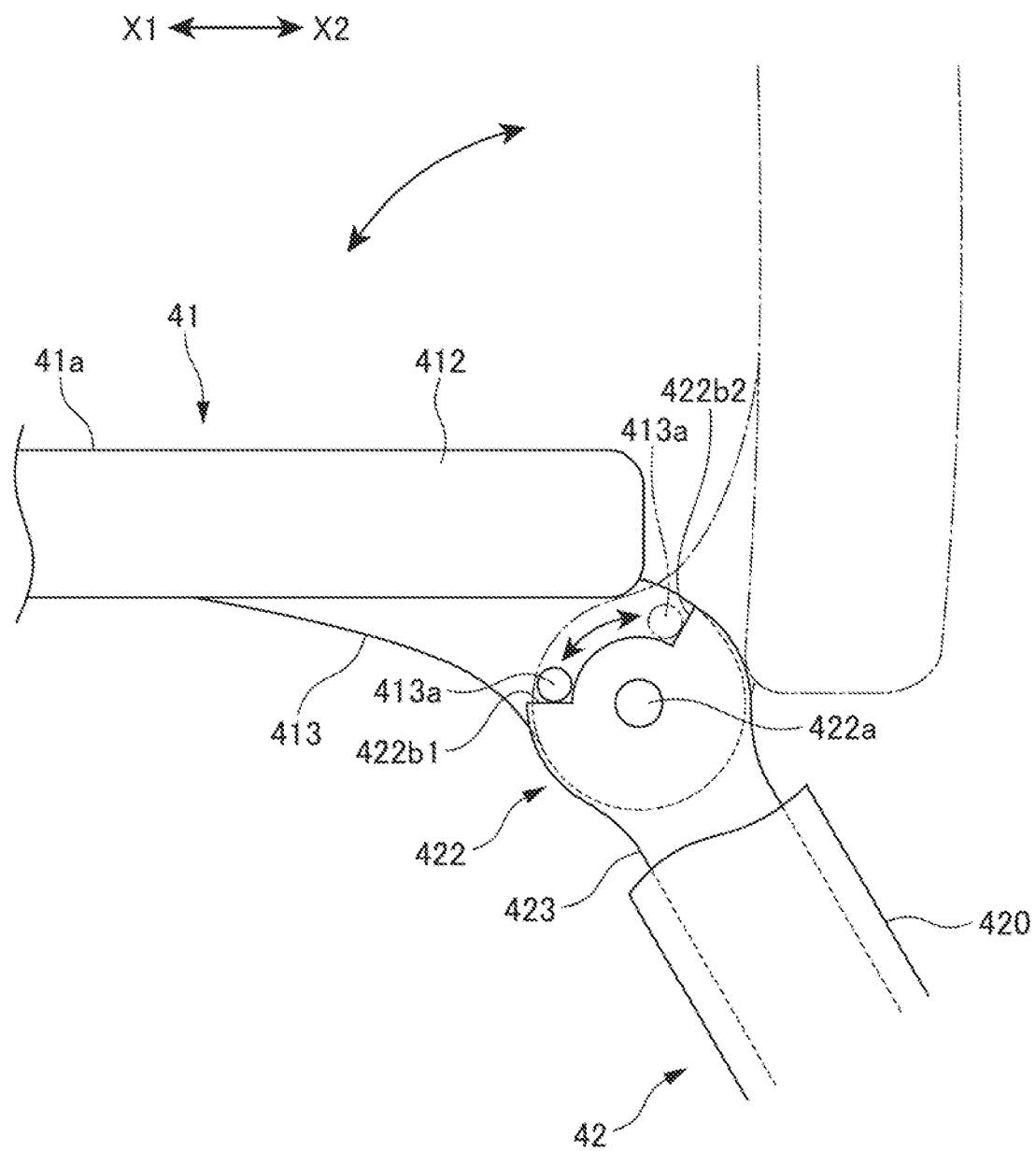
FIG. 6 is a diagram illustrating a structure via which the armrest body is mounted.

As illustrated in FIG. 6, the coupler 413 of the armrest body 41 is turnably mounted on a shaft 422a provided to the second pivot part 422 of the position adjustment mechanism 42. The shaft 422a of the second pivot part 422 is located on an end portion of a metal stay 423. The metal stay 423 is a long member that connects the first pivot part 421 and the second pivot part 422 of the position adjustment mechanism 42 to each other. The position adjustment mechanism 42 is formed by covering the metal stay 423 with a design cover 420 that is made of, for example, a resin.

The second pivot part 422 has an arc-shaped cutout 422b centered on the shaft 422a. The cutout 422b receives therein a projection 413a projecting from the coupler 413. The armrest body 41 can freely turn around the shaft 422a within a range corresponding to the cutout 422b in which the projection 413a can move.

In FIG. 6, the projection 413a at the position indicated by the solid curve is in contact with a front end 422b1 located on a front side of the cutout 422b. In this state, the armrest body 41 has been turned around the shaft 422a in the forward direction to a maximum extent. When the position adjustment mechanism 42 is turned rearward to move the armrest body 41 to the deployment position, the projection 413a comes into contact with the front end 422b1 of the cutout 422b, and thereby defines a limit of a forward turn range of the armrest body 41.

On the other hand, in FIG. 6, the projection 413a at the position indicated by the dot-dot-dash curve is in contact with a rear end 422b2 located on a rear side of the cutout 422b. In this state, the armrest body 41 has been turned around the shaft 422a in the rearward direction to a maximum extent. When the position adjustment mechanism 42 is turned forward to move the armrest body 41 to the retraction position, the projection 413a comes into contact with the rear end 422b2 of the cutout 422b, and thereby defines a limit of a rearward turn range of the armrest body 41.

Figure 7:
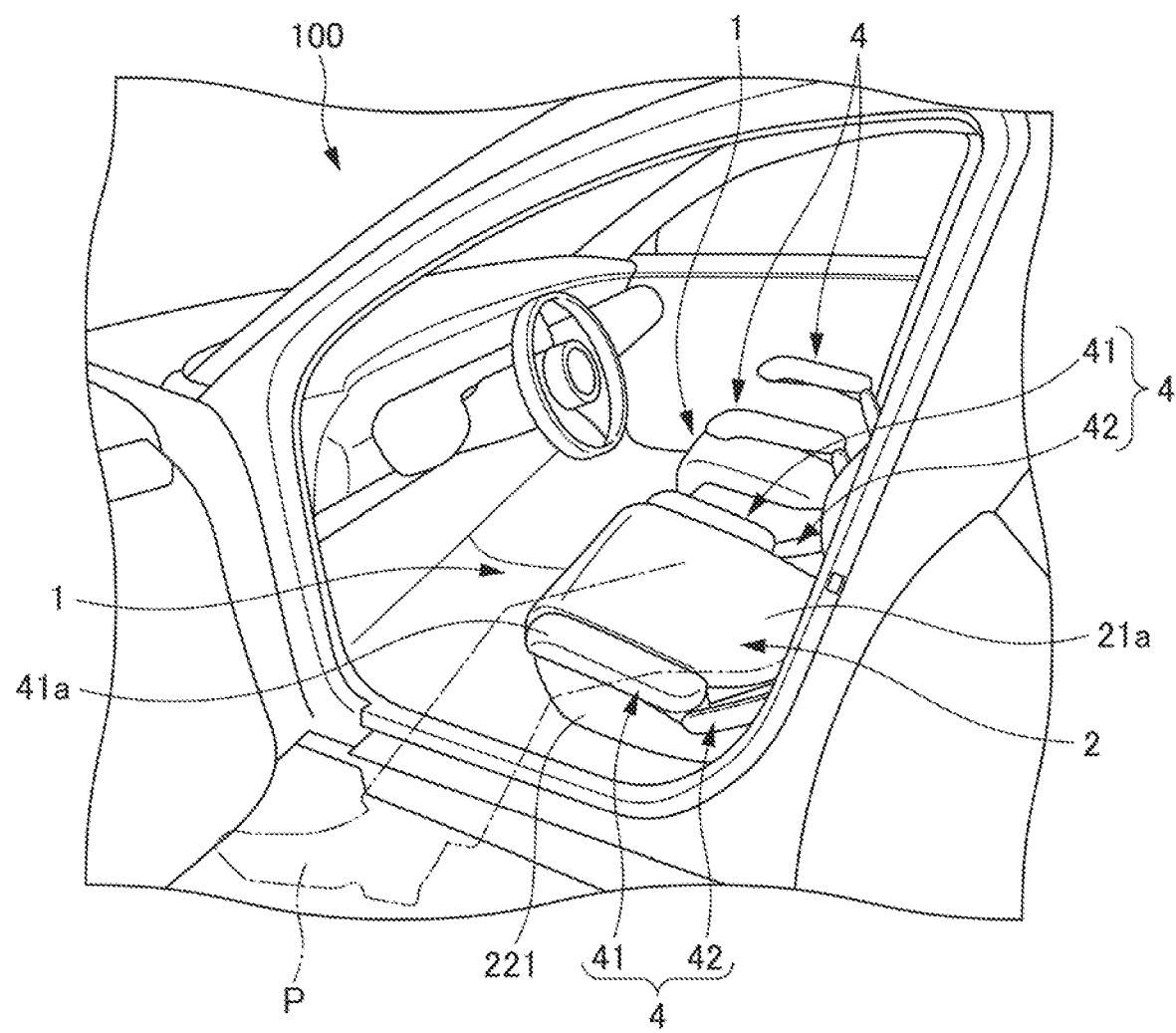
FIG. 7 is a diagram illustrating a movement of a person who is getting in or out of a vehicle in a state where the armrest of the vehicle seat is in a retraction position.

As illustrated in FIGS. 2 and 3, the armrest body 41 moved to the retraction position by way of the position adjustment mechanism 42 is coplanar with the upper surface 21a of the seat cushion 21, the upper surface 21a constituting an upper surface of the seat part 2. In other words, an upper surface 41a of the armrest body 41 in the retraction position is coplanar with the upper surface 21a of the seat cushion 21. When the armrests 4 are retracted, there is no component projecting upward or forward with respect to the seat part 2. Accordingly, as illustrated in FIG. 7, the armrests 4 are kept out of the way of an occupant P who is getting in or out of a vehicle 100. Thus, the vehicle seat 1 allows the occupant to easily get in and out of the vehicle 100 even though the vehicle seat 1 has the armrests 4. When the armrests 4 are in the retraction state, the occupant can easily move in the front-rear direction in the vehicle 100 (walk through) without being hindered by the armrests 4.

Note that a state described as upper surfaces 41a of the armrest bodies 41 are coplanar with the upper surface 21a of the seat cushion 21 is not limited to a configuration in which the position of the upper surfaces 41a and that of the upper surface 21a are precisely coincident with each other in the horizontal direction, but includes a configuration in which the upper surfaces 41a, 21a are substantially coplanar with each other. In other words, when the armrest bodies 41 are in the retraction position, it is only necessary for the upper surfaces 41a, 21a to be positioned to allow the seated person to move in the lateral direction without difficulty while remaining in a sitting posture, and a slight difference in the vertical direction between the upper surfaces 41a, 21a is permissible.

As illustrated in FIGS. 2 and 3, the armrest body 41 in the retraction position is on the upper surface 221a of the protruding portion 221 of the seat part body 22. The protruding portion 221 of the seat part body 22, which is harder than the seat cushion 21, can strongly support the armrest body 41 from below when a load is downwardly applied to the armrest body 41. With this configuration, the armrest body 41 in the retraction position increases in load-carrying capacity.

Figure 8:
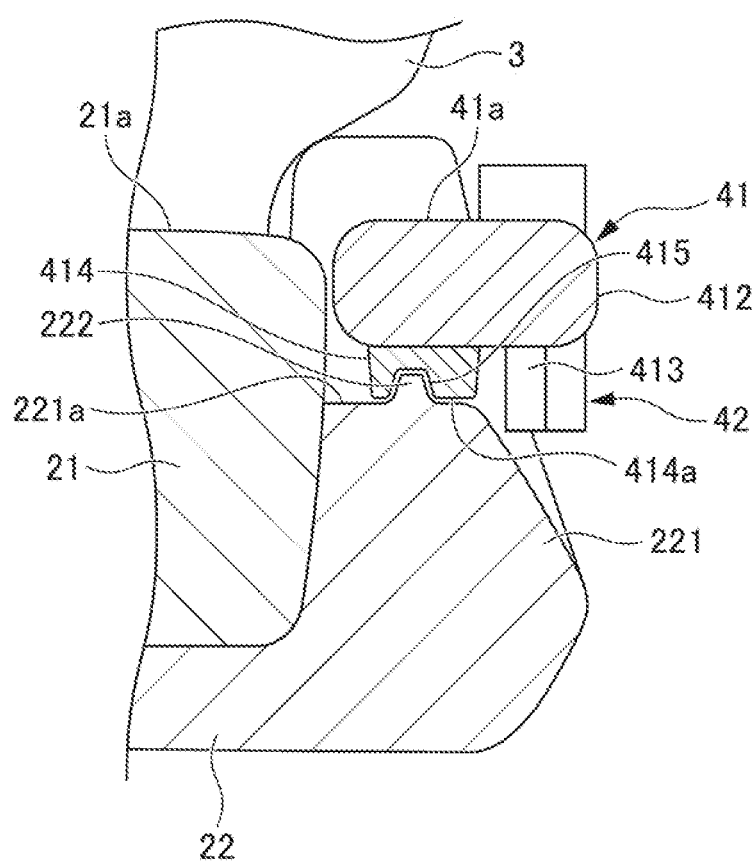
FIG. 8 is a cross-sectional view illustrating the armrest in the retraction position and the seat part, the cross-sectional view being taken along line A-A in FIG. 4.

As illustrated in FIG. 8, when the armrest body 41 is in the retraction position, the rib 222 on the upper surface 221a of the protruding portion 221 engages with the recess 415 provided on the lower surface 414a of the ridge 414 of the armrest body 41. This configuration causes the armrest body 41 in the retraction position to be reliably positioned with respect to the upper surface 221a of the protruding portion 221, and hinders the armrest body 41 from moving in the lateral direction. Thus, the armrest body 41 in the retraction position increases in load-carrying capacity in the lateral direction. Note that the protruding portion 221 may have a recess and the armrest body 41 may have a rib.

Next, the structure of the position adjustment mechanism 42 of the armrest 4 is specifically described with reference to FIGS. 9 to 12. FIGS. 9 to 12 illustrate specifics of the structure of the first pivot part 421 of the position adjustment mechanism 42. The position adjustment mechanism 42 of the present embodiment is constituted by a ratchet mechanism that can perform multi-stage adjustment by turning and setting the armrest body 41 at multiple positions including the deployment position and the retraction position.

Figure 9:
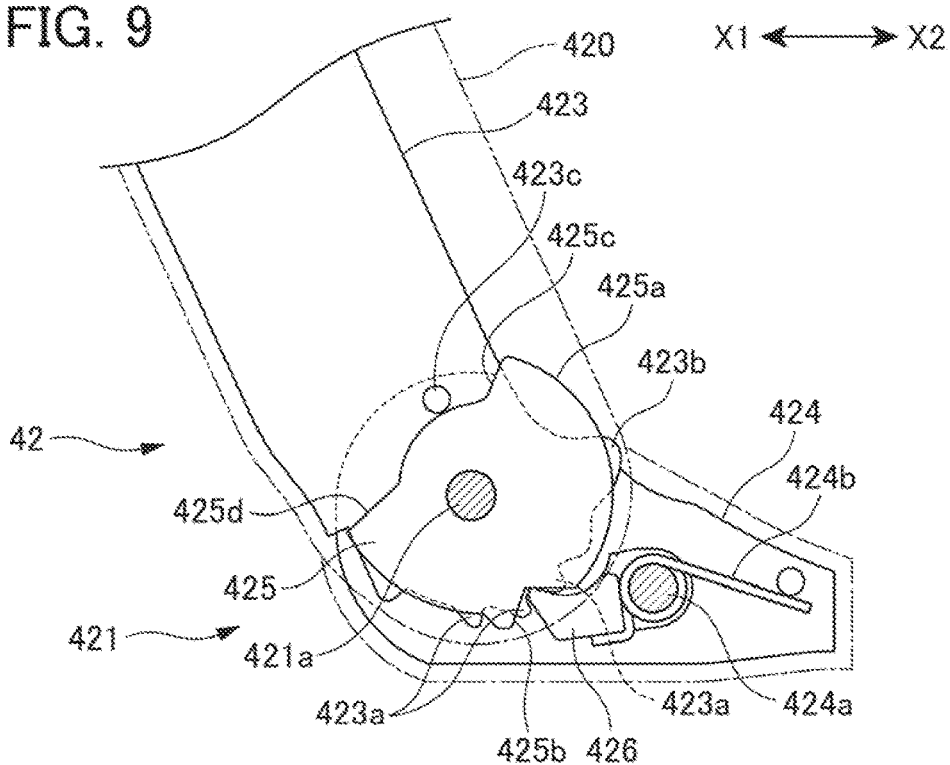
FIG. 9 is a diagram illustrating an angle adjustment mechanism of the armrest.

As illustrated in FIG. 9, the first pivot part 421 of the position adjustment mechanism 42 has the shaft 421a projecting from a metal anchor 424. The shaft 421a pivotally supports the metal stay 423 and a cam plate 425. The metal anchor 424 is mounted to a side of the rear end portion 22a of the seat part body 22.

The metal anchor 424 has another shaft 424a pivotally supporting a pawl 426 in a turnable manner. The metal stay 423 has an end which is arranged in the first pivot part 421, and an outer periphery of which is provided with a plurality of ratchet teeth 423a and one protruding stopper 423b. A spring 424b provided on the metal anchor 424 urges the pawl 426 in a direction in which the pawl 426 is meshed with the ratchet teeth 423a of the metal stay 423.

The cam plate 425 has, on an outer periphery thereof, a guide surface 425a, a notch 425b, a first contact portion 425c, and a second contact portion 425d. The guide surface 425a has an arc shape and is sized to have an outer edge located slightly radially outward relative to the ratchet teeth 423a so as to hinder the pawl 426 from meshing with the ratchet teeth 423a. The notch 425b has a substantially V-shape and allows the pawl 426 to mesh with the ratchet teeth 423a. The first contact portion 425c and the second contact portion 425d are configured to contact with a restriction projection 423c projecting from the metal stay 423.

Figure 10:
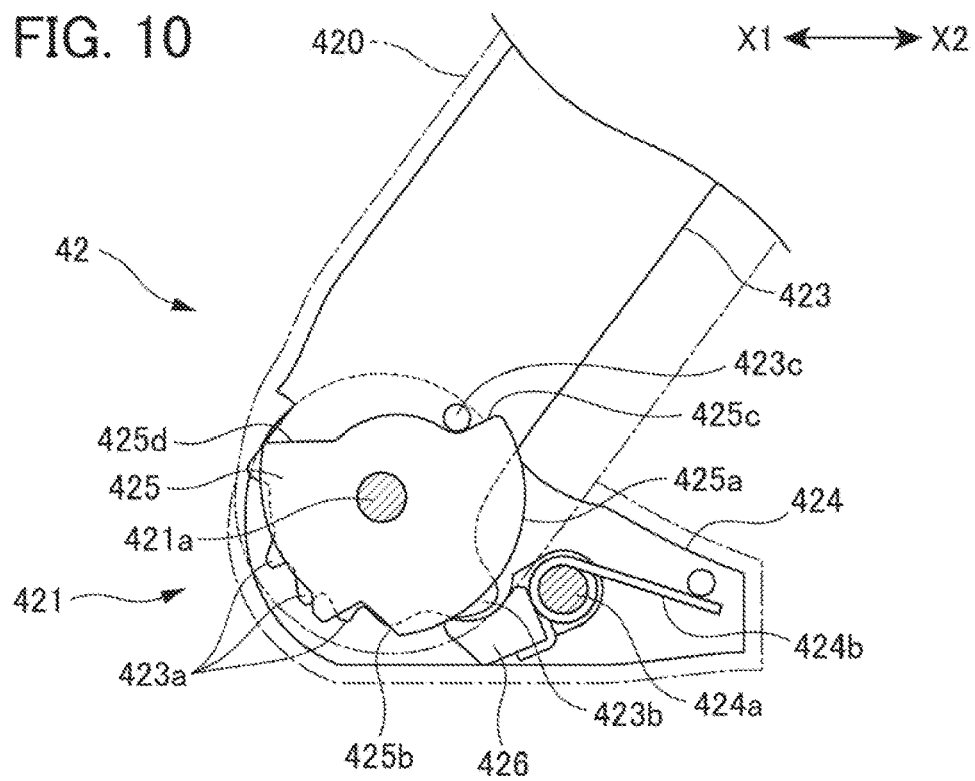
FIG. 10 is a diagram illustrating the angle adjustment mechanism of the armrest.
Figure 12:
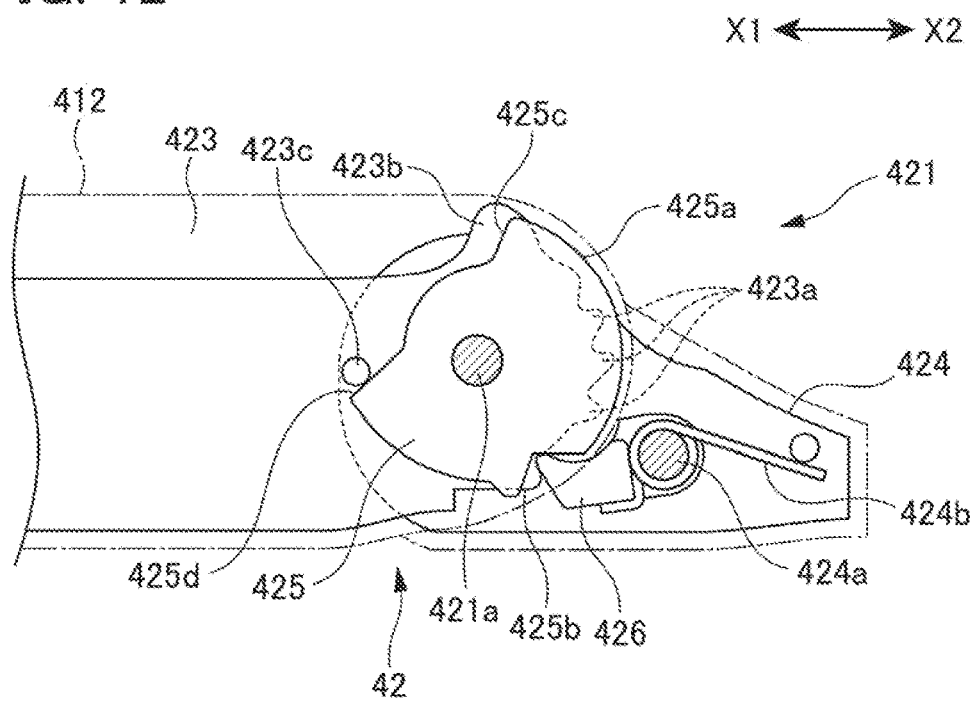
FIG. 12 is a diagram illustrating the angle adjustment mechanism of the armrest.

FIG. 12 illustrates a state in which the metal stay 423 has been turned forward to a maximum extent with respect to the metal anchor 424 (and in which the armrest body 41 is in the retraction position). In this state, the pawl 426 is fitted in the notch 425*b* of the cam plate 425 while the second contact portion 425*d* of the cam plate 425 is in contact with the restriction projection 423*c* of the metal stay 423. On the other hand, FIG. 10 illustrates a state in which the metal stay 423 has been turned rearward to a maximum extent with respect to the metal anchor 424. In this state, the first contact portion 425*c* of the cam plate 425 is in contact with the restriction projection 423*c* of the metal stay 423.

Figure 11:
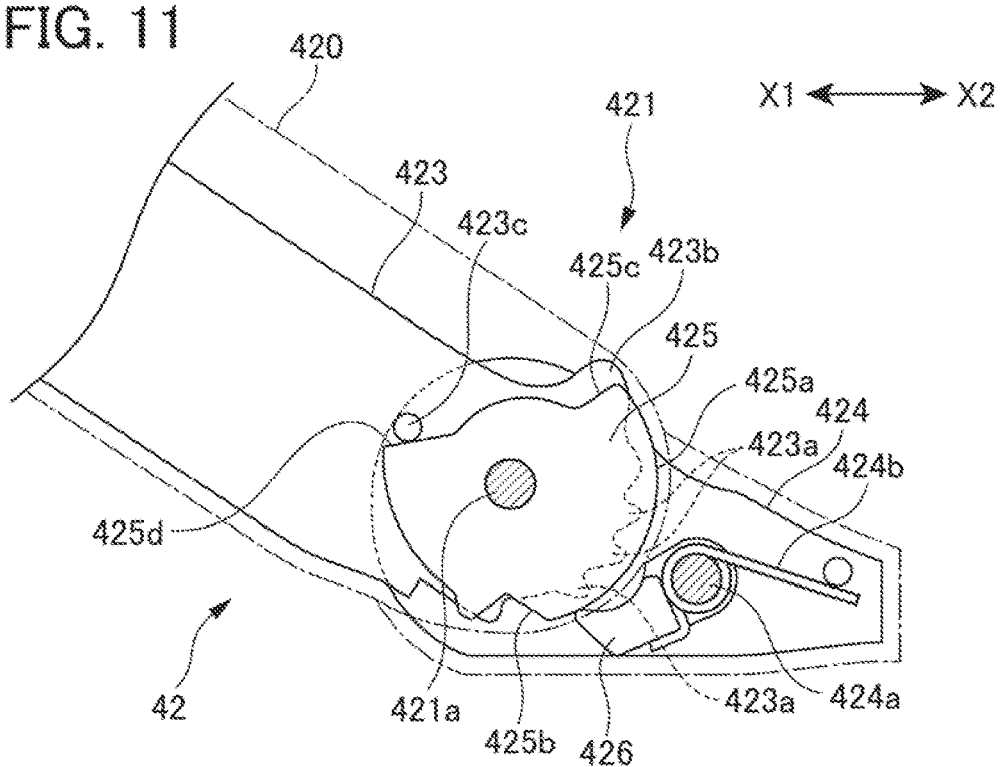
FIG. 11 is a diagram illustrating the angle adjustment mechanism of the armrest.

The plurality of ratchet teeth 423*a* are configured such that when meshed with the pawl 426, the ratchet teeth 423*a* prevent the metal stay 423 from turning forward, but allows the metal stay 423 to turn rearward. As illustrated in FIGS. 9 and 11, an angle of the metal stay 423 is set by way of meshing of the pawl 426 with one of the ratchet teeth 423*a*. With this configuration, the position adjustment mechanism 42 positions the armrest body 41 in the deployment position in which the armrest body 41 is deployed and positioned above the retraction position. When the metal stay 423 turns rearward, the pawl 426 becomes meshed with a different one of the ratchet teeth 423*a*. This configuration enables the position adjustment mechanism 42 to perform multi-stage position adjustment of the armrest body 41 in the deployment position. Thus, the seated person can deploy and optimally position the armrest bodies 41 according to his/her physique and liking.

As illustrated in FIG. 10, when the metal stay 423 has been turned rearward to the maximum extent, the stopper 423*b* provided to the metal stay 423 is in contact with an upper surface of the pawl 426 and turns the pawl 426 away from the ratchet teeth 423*a*, against the urging force of the spring 424*b*. In this state, the restriction projection 423*c* of the metal stay 423 is in contact with the first contact portion 425*c* of the cam plate 425. As a result, the cam plate 425 turns rearward in conjunction with the rearward turn of the metal stay 423, whereby the guide surface 425*a* of the cam plate 425 comes into contact with the pawl 426. Since the guide surface 425*a* has the outer edge located radially outward relative to the ratchet teeth 423*a*, the contact of the pawl 426 with the guide surface 425*a* causes the ratchet teeth 423*a* to become unmeshed with the pawl 426.

In the state where the pawl 426 is in contact with the guide surface 425*a* of the cam plate 425, when the seated person moves the armrest body 41 toward the retraction position, the metal stay 423 turns forward along with the movement of the armrest body 41, as illustrated in FIGS. 11 and 12. The turn of the metal stay 423 causes the restriction projection 423*c* to move from first contact portion 425*c* to the second contact portion 425*d* of the cam plate 425. While the metal stay 423 moves in this way, the cam plate 425 is not turned and the pawl 426 is maintained in contact with the guide surface 425*a* of the cam plate 425.

As illustrated in FIG. 12, in the state where the armrest body 41 is in the retraction position, the pawl 426 is fitted in the notch 425*b* because the restriction projection 423*c* of the metal stay 423 has turned the cam plate 425 forward while being in contact with second contact portion 425*d* of the cam plate 425. Thereafter, when the seated person moves the armrest body 41 upward toward the deployment position, the metal stay 423 turns rearward. As a result, one of the ratchet teeth 423*a* is meshed with the pawl 426 as illustrated in FIG. 9, whereby the armrest body 41 is positioned as desired in the deployment position.

The position adjustment mechanism 42 of the present embodiment has the ratchet mechanism implemented in the first pivot part 421. However, a similar ratchet mechanism may be implemented in the second pivot part 422. This configuration enables multi-stage adjustment of an angle between the armrest body 41 in the deployment position and the metal stay 423 of the position adjustment mechanism 42.

Note that the ratchet mechanism described above is a non-limiting example. In the vehicle seat 1, it is merely necessary for the position adjustment mechanism 42 of the armrest 4 to have a mechanism capable of adjusting the armrest body 41 between at least two positions including the deployment position and the retraction position.

The vehicle seat 1 of the present embodiment has two armrests 4 respectively provided on the right and left sides of the seat part 2. However, the armrest 4 may be provided only one of the right and left sides of the seat part 2. The vehicle seat 1 with the armrest(s) 4 is not limited to a driver's seat, but is applicable to all the seats in a vehicle. Further, the vehicle seat is not limited to a seat for one person, but is applicable to, for example, a seat for two or three persons, such as a vehicle rear seat.

EXPLANATION OF REFERENCE NUMERALS

1: Vehicle Seat
2: Seat Part
21: Seat Cushion
21*a*: Upper Surface of Seat Part
22: Seat Part Body
221: Protruding Portion
221*a*: Upper Surface of Protruding Portion
222: Rib
3: Back Part
4: Armrest
41: Armrest Body
414*a*: Lower. Surface of Armrest Body
415: Recess
42: Position Adjustment Mechanism

What is claimed is:

1. A vehicle seat comprising:
a seat part;
a back part; and
an armrest pivotally supported by the seat part,
wherein the armrest includes an armrest body and a position adjustment mechanism that is capable of adjusting the armrest body between at least two positions including a deployment position in which the armrest body is deployed above the seat part and a retraction position in which the armrest body is retracted to be positioned adjacent to the seat part, and
wherein an upper surface of the armrest body in the retraction position is coplanar with an upper surface of the seat part
wherein the seat part includes a seat cushion and a seat part body sized to have protruding portions that respectively protrude laterally outward relative to right and left sides of the seat cushion, the seat part body being harder than the seat cushion, and
wherein the armrest body in the retraction position is arranged on an upper surface of the protruding portion of the seat part body that protrudes relative to the seat cushion.

2. The vehicle seat according to claim 1,
wherein the position adjustment mechanism enables multi-stage angle adjustment of the armrest body in the deployment position.

3. The vehicle seat according to claim 1,
the armrest comprises a pair of armrests respectively arranged on right and left sides of the seat part.

4. The vehicle seat according to claim 1,
wherein the protruding portion has a rib or a recess formed on the upper surface thereof, and
wherein the armrest body has a recess or a rib formed on a lower surface thereof, the recess or the rib of the armrest body being engageable with the rib or the recess of the protruding portion when the armrest body is in the retraction position.

\* \* \* \* \*